United States Patent
Bloy

(10) Patent No.: US 8,599,024 B2
(45) Date of Patent: *Dec. 3, 2013

(54) RADIO FREQUENCY ENVIRONMENT OBJECT MONITORING SYSTEM AND METHODS OF USE

(75) Inventor: Graham P. Bloy, St. Louis, MO (US)

(73) Assignee: RF Controls, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,971

(22) Filed: Jan. 17, 2012

(65) Prior Publication Data

US 2012/0112913 A1    May 10, 2012

Related U.S. Application Data

(63) Continuation of application No. 12/395,595, filed on Feb. 27, 2009, now Pat. No. 8,120,488.

(51) Int. Cl.
*G08B 13/14* (2006.01)

(52) U.S. Cl.
USPC .......... 340/572.1; 340/539.13; 340/10.1

(58) Field of Classification Search
USPC .......................... 340/539.13, 572.1
See application file for complete search history.

(56) References Cited

U.S. PATENT DOCUMENTS

| | | | |
|---|---|---|---|
| 5,686,928 A | 11/1997 | Pritchett et al. | |
| 6,480,108 B2 | 11/2002 | McDonald | |
| 6,753,782 B2 | 6/2004 | Power | |
| 6,989,741 B2 | 1/2006 | Kenny et al. | |
| 7,002,461 B2 | 2/2006 | Duncan et al. | |
| 7,030,761 B2 | 4/2006 | Bridgelall et al. | |
| 7,061,366 B2 | 6/2006 | Bell et al. | |
| 7,098,794 B2 | 8/2006 | Lindsay et al. | |
| 7,119,687 B2 | 10/2006 | Paulsen et al. | |
| 7,119,738 B2 | 10/2006 | Bridgelall et al. | |
| 7,138,914 B2 | 11/2006 | Culpepper et al. | |
| 7,151,454 B2 | 12/2006 | Washington | |
| 7,154,395 B2 | 12/2006 | Raskar et al. | |
| 7,170,412 B2 | 1/2007 | Knox et al. | |
| 7,183,922 B2 | 2/2007 | Mendolia et al. | |
| 7,183,933 B2 | 2/2007 | Dzurko et al. | |
| 7,187,288 B2 | 3/2007 | Mendolia et al. | |
| 7,199,712 B2 | 4/2007 | Tafas et al. | |
| 7,199,719 B2 | 4/2007 | Seinberg | |
| 7,221,269 B2 | 5/2007 | Onderko et al. | |
| 7,257,418 B1 | 8/2007 | Chang et al. | |
| 7,265,673 B2 * | 9/2007 | Teller .................... 340/572.1 |

(Continued)

OTHER PUBLICATIONS

European search report for counterpart application No. 10001521.3-2220. Issued on Jun. 29, 2010.

(Continued)

*Primary Examiner* — Kerri McNally
(74) *Attorney, Agent, or Firm* — Babcock IP, PLLC

(57) ABSTRACT

A method and apparatus for monitoring untagged objects in a target area including calibrating a radio environment monitoring system including a rules engine and a baseline data set for a target area by recording a set of changes to the RF environment fingerprint of the target area received by the radio environment monitoring system as the target area is filled with objects. During system operation, scanning the target area with the radio environment monitoring system for a current RF environment fingerprint, comparing the current RF environment fingerprint with the baseline data set by a rules engine and reporting an output of the rules engine.

17 Claims, 13 Drawing Sheets

(56) References Cited

U.S. PATENT DOCUMENTS

| | | |
|---|---|---|
| 7,667,646 B2 | 2/2010 | Kalliola et al. |
| 8,120,488 B2 * | 2/2012 | Bloy .......................... 340/572.1 |
| 2004/0102869 A1 | 5/2004 | Andersen et al. |
| 2004/0102870 A1 | 5/2004 | Andersen et al. |
| 2004/0233461 A1 | 11/2004 | Armstrong et al. |
| 2005/0012613 A1 | 1/2005 | Eckstein et al. |
| 2005/0110674 A1 | 5/2005 | Mendolia et al. |
| 2005/0258956 A1 * | 11/2005 | Neuwirth ................. 340/539.13 |
| 2005/0280504 A1 | 12/2005 | Pettus |
| 2006/0019679 A1 | 1/2006 | Rappaport et al. |
| 2006/0022800 A1 | 2/2006 | Krishna et al. |
| 2006/0187043 A1 | 8/2006 | Allen |
| 2006/0214792 A1 * | 9/2006 | Goyal et al. ............... 340/572.1 |
| 2006/0267731 A1 | 11/2006 | Chen |
| 2007/0013516 A1 | 1/2007 | Freitag et al. |
| 2007/0013521 A1 | 1/2007 | Lindsay et al. |
| 2007/0018820 A1 | 1/2007 | Chand et al. |
| 2007/0075864 A1 | 4/2007 | Culpepper et al. |
| 2007/0096909 A1 | 5/2007 | Lally |
| 2007/0097211 A1 | 5/2007 | Washington |
| 2007/0103303 A1 | 5/2007 | Shoarinejad |
| 2007/0103313 A1 | 5/2007 | Washington |
| 2007/0120671 A1 | 5/2007 | Carmichael et al. |
| 2007/0120736 A1 | 5/2007 | MacKenzie et al. |
| 2007/0141997 A1 | 6/2007 | Wulff et al. |
| 2007/0152829 A1 | 7/2007 | Lindsay et al. |
| 2008/0030422 A1 | 2/2008 | Gevargiz et al. |
| 2009/0212921 A1 * | 8/2009 | Wild et al. .................. 340/10.5 |

OTHER PUBLICATIONS

International Search Report for PCT Application No. PCT/IB/53643; ISA/US, mailed Mar. 30, 2009.

Gonzalez Moreno, J: Extended European Search Report for EP application No. 08789680.9, European Patent Office, Apr. 12, 2011 (transmitted Apr. 19, 2011), Munich DE.

* cited by examiner

RADIO FREQUENCY ENVIRONMENT OBJECT MONITORING SYSTEM AND METHODS OF USE

CROSS REFERENCE TO RELATED APPLICATIONS

This application is a continuation of commonly owned co-pending U.S. Utility patent application Ser. No. 12/395,595, titled "Radio Frequency Environment Object Monitoring System and Methods of Use", filed Feb. 27, 2009 by Graham P. Bloy, currently pending and hereby incorporated by reference in its entirety.

BACKGROUND

1. Field of the Invention

This invention relates to a radio frequency environment monitoring system for object presence feedback. More particularly, the invention relates to a radio frequency environment monitoring system for RFID tagged and/or untagged object monitoring via analysis of changes to the monitored RF environment occurring as the objects present in the monitored area are varied in position and or number.

2. Description of Related Art

Previous RFID tag inventory and or object passage gateway monitoring systems have relied upon reading one or a plurality of tags, each tag representing a unit or known quantity of units of associated objects.

It is not practical to apply an RFID tag to each object to be monitored, and/or it is desirable to monitor the presence of quantities of the objects to be monitored with greater precision than just a binary indication of an RFID tag associated with a quantity of objects each of which may or may not be tagged, as might be the case with items contained in a parts bin.

In prior RFID portal systems, RFID readers monitor RFID tags attached to objects and/or object loads during passage through, for example, a number of dock doors in a distribution center. Because of the nature of known RFID systems it is not always possible to determine whether particular tags are in a particular door. It is possible for example for a reader in door 2 to read a tag in door 1 or door 3. Without special door sensors, it is not possible to determine whether a particular door is open or closed and whether an object is moving out of the distribution center or into the distribution center.

Further, many items have packaging that is not complementary to being tagged, such as metal cans and/or plastic bottles, such as soft drinks. Also, it is not economical to tag individual items, such as nails, bolts, batteries, coins or the like. To optimize inventory operations, for example for Just In Time inventory systems, it is required to know the rate of depletion and/or when inventory of a specific item is about to be depleted, before actual depletion occurs.

Therefore, it is an object of the invention to provide an object monitoring solution that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
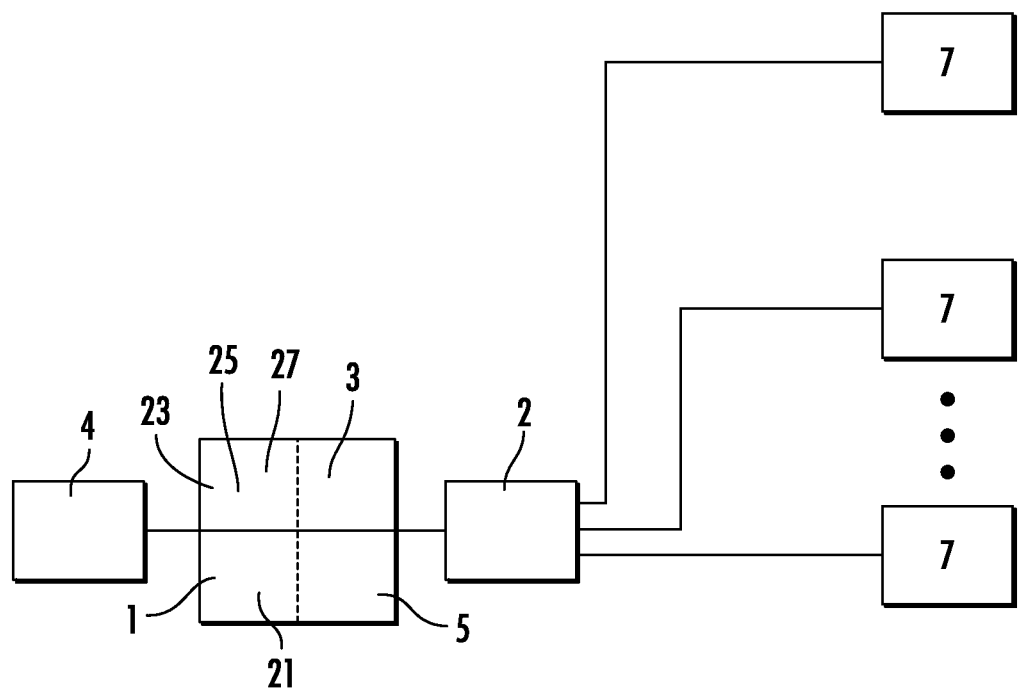
FIG. 1 is a schematic block diagram of an exemplary radio environment monitoring system according to the invention.

The inventor has recognized that the entirety of the monitored radio frequency environment, hereafter referred to as the RF environment fingerprint, may be used to derive changes of object presence and/or location(s), even where the individual objects within the target area are not each provided with their own individual RFID tag.

It is possible to monitor the presence and/or direction of movement of an RFID tag within a three dimensional target area via RFID monitoring systems. For example, International Patent Application serial number PCT/US08/58824, titled "Radio Frequency Signal Acquisition and Source Location System" filed Mar. 30, 2008 by Bloy et al, and International Patent Application serial number PCT/IB2008/053643, titled "Steerable Phase Array Antenna RFID Tag Locater and Tracking System", filed Sep. 9, 2008 by Bloy, both applications commonly owned with the present application and hereby incorporated by reference in their entirety, describe systems of cooperating steerable phased array antennas performing beam scans of a target area, via an electronic beam steering circuit such as an array of phase shifters coupled to a corresponding array of antenna elements of a panel antenna, from which the presence and location of individual RFID tags is derived by logical processing of historical signal data obtained from prior scans of the target area.

To derive the location of the RFID tags, the RF signal intelligent tracking and control system (ITCS) of PCT/US08/58824 processes a plurality of signals received in response to a scanning narrow beam interrogation signal directed through the target area to derive which are true signals received directly from an individual RFID tag and which are pseudo emitter reflections of the same RFID tag response signal (carrying the same RFID tag identifier) reflecting off of secondary surfaces before finally reaching an antenna. The received signal information may be processed to reject the pseudo emitters, thus identifying the signal response to focus three-dimensional location routines upon, thereby identifying the RFID tag position in three dimensions. The identified RFID tag locations may be combined to generate a three dimensional picture of each of the RFID tag locations in the target area and, over time, the movement if any of the RFID tags.

Further, the ITCS may apply highly focused and/or varied interrogation signal power, for example to penetrate adjacent objects and/or packaging surrounding a specific RFID tag.

An ITCS includes an electronically steerable phase array antenna connected to a phase shift network and a radio frequency transmitter-receiver unit. For purposes of the present invention, the transmitter-receiver unit may or may not be specifically configured for identifying, tracking and locating RFID tags. The transmitter-receiver unit may contain circuit and/or logic capabilities to perform, in cooperation with an electronic steering circuit and antenna, functions such as:

transmission of a continuous wave signal
modification and/or modulation of the continuous wave signal
reception of a return signal
demodulation of the return signal
return signal signal strength measurement
time delay measurement between a transmitter signal and the return signal
phase measurement of the return signal compared with the phase of the transmitter signal; and
reporting the strength, relative phase and time delay of the returned signal.

The transmitter-receiver unit is under the control of and provides received signal information to a processing unit that may be local to or remote from the antenna and/or transmitter-receiver. The processing unit causes the transmitter-receiver to transmit a continuous wave signal and further causes the continuous wave signal to be modified/modulated as desired. The processing unit also commands the electronic steering circuit, either directly or via a communications link to a dedicated electronic steering sub-processor/controller, to direct the beam emitted from the steerable phased array antenna into different directions, for example directing the beam direction through a raster scan or the like of the target area. At each point or position of the beam an output report of the transmitter-receiver unit is passed to the processor containing, for example:

a scan direction and time code;
refractive frequency index of any RFID tag(s) detected;
relative phase and time delay;
Return Signal Strength Indicator (RSSI)—the coverage or lack of coverage of the RFID tag by objects will change the RSSI (a delta of signal absorption); and
multipath pseudo emitter shift (error)—the multiple pseudo reflections and their monitored location will change as the position and or coverage of the signal source by other objects changes.

The output report may be stored in a memory, register or table that may be temporary or permanent, hereafter referred to as the data matrix.

As disclosed in PCT/US08/58824, the ITCS is able to detect so called pseudo emitters and use multi-path ambiguity resolution algorithms to reduce or eliminate positional ambiguity these signals introduce when attempting to identify the locations of RFID tagged items in a target area. While the prior ITCS RFID tracking and location systems included extensive logic dedicated to the identification and rejection of these pseudo emitter signals, the present invention recognizes that these signals, especially when their appearance, location and/or disappearance is tracked over time as part of the overall RF environment fingerprint present in a target area, may be interpreted as an object presence and/or location indicator for untagged objects within the target area.

As shown in FIG. 1, an exemplary system according to the invention is a variation of an ITCS including a plurality of antenna(s) 7 coupled to a transceiver 2. The antenna(s) 7 providing a signal beam steerable via a separate or integrated beam controller directed by the transceiver 2 and/or processor 1. The processor unit 1 also includes a rules engine 3 operating in concert with the normal ITCS processor functions upon the present RF environment fingerprint and a collection of baseline configuration data, for example stored in a data matrix 5 of the processor unit 1. Alternatively, the ITCS may include multiple transceiver(s) 2, each dedicated to a separate or multiple antenna(s) 7. System commands are input and results are output via an operator interface 4

Figure 2:
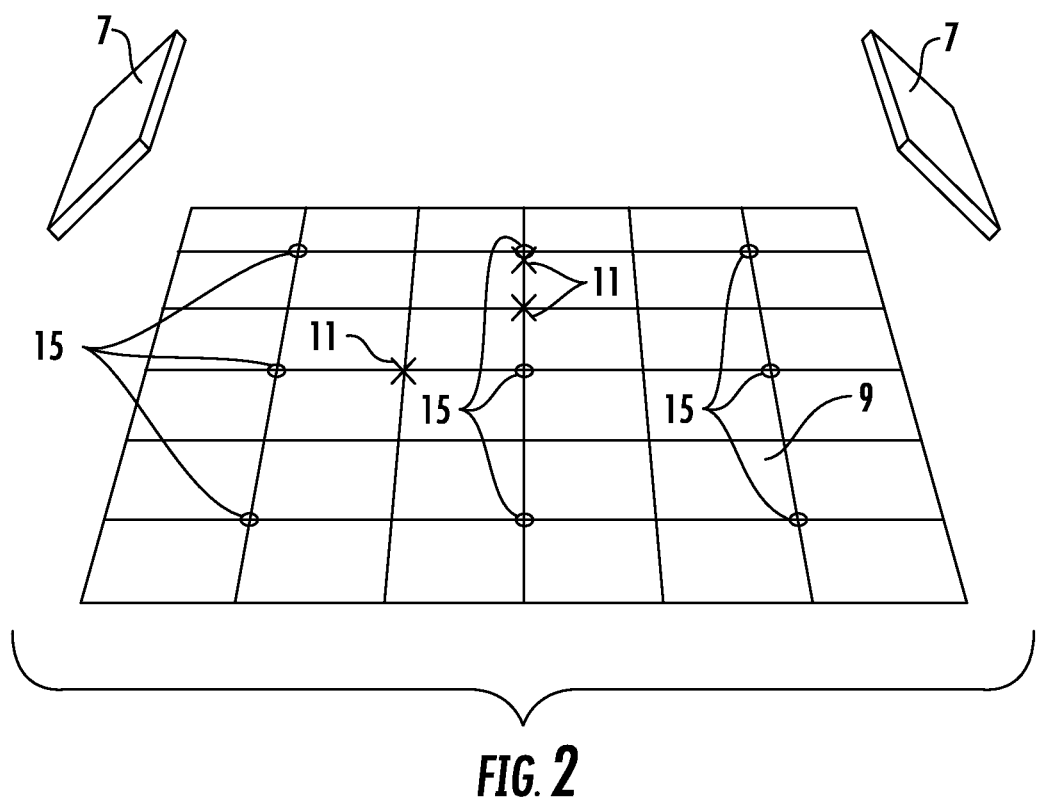
FIG. 2 is a schematic diagram demonstrating reference tags in a target area and a pair of cooperating RF transmitter-receiver/beam steering/antenna assemblies positioned to scan the target area.

The rules engine 5 compares the real time RF environment fingerprint with a set of baseline calibration RF environment fingerprint data sets to identify pseudo emitter and/or response signal degradation indications of changes to the number and/or position of untagged objects present in the target area. Resolution of the location, pseudo emitter and/or response signal degradation indications is greatly increased when multiple antenna(s) 7 of the ITCS are arrayed about the target area 9, for example as shown in FIG. 2. At least two antenna(s) 7 enabling the application of triangulation logic between a beam vector of each antenna 7 to generate an accurate z-axis position parameter of signal sources useful alone or as a further accuracy check upon z-axis estimates derived from signal timing routines.

Figure 3:
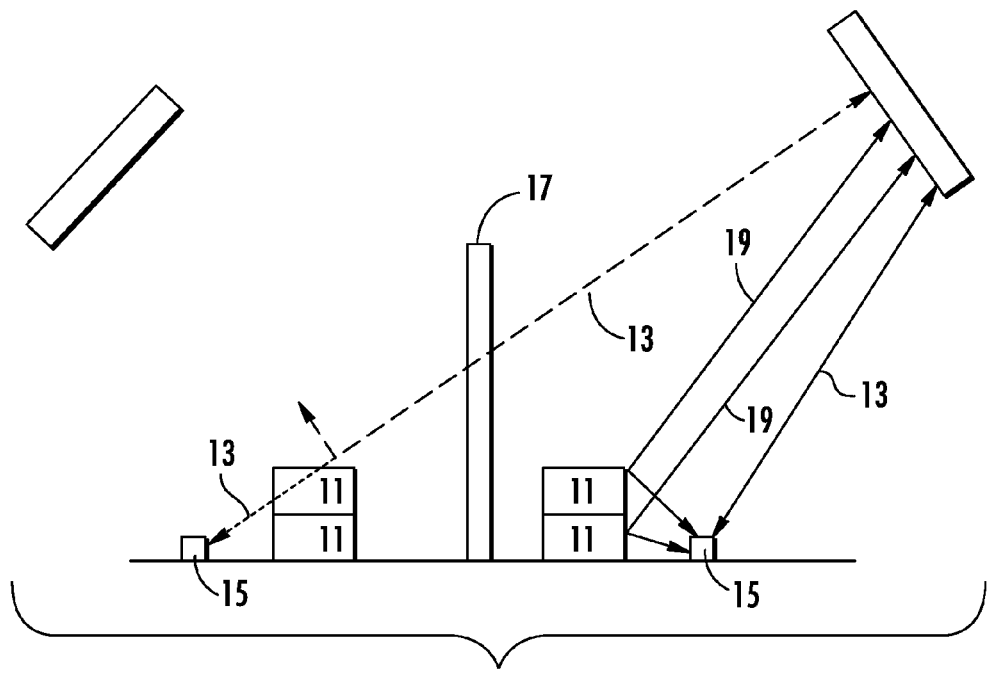
FIG. 3 is a schematic diagram demonstrating signal paths with respect to reference tags in a target area detected by an antenna within a target area, the target area filled with untagged objects.
Figure 4:
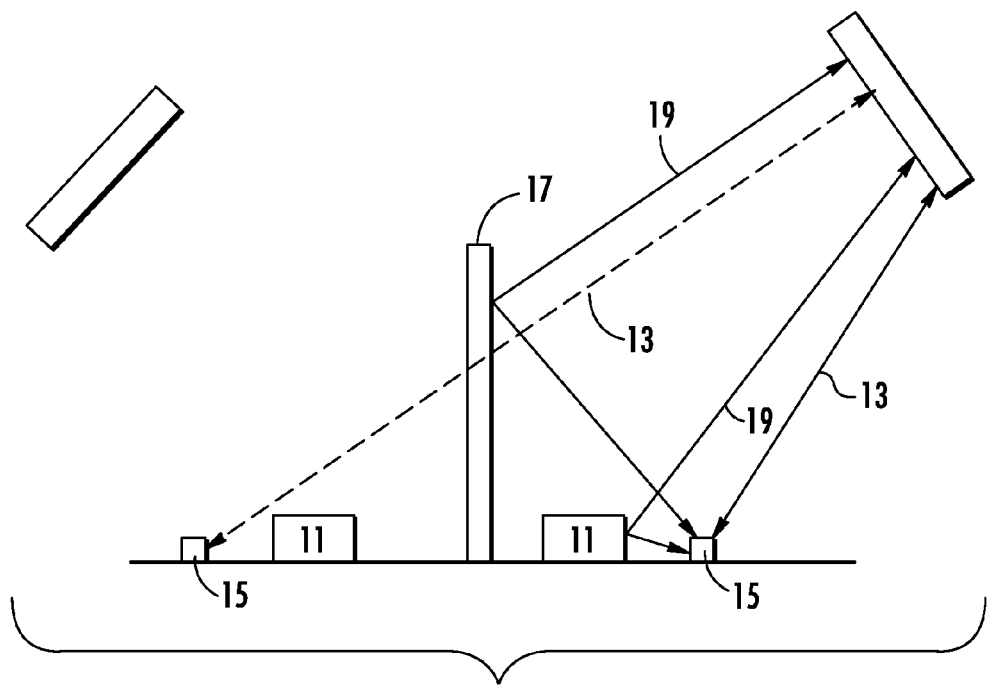
FIG. 4 is a schematic diagram according to FIG. 3, with one half the untagged objects removed.
Figure 5:
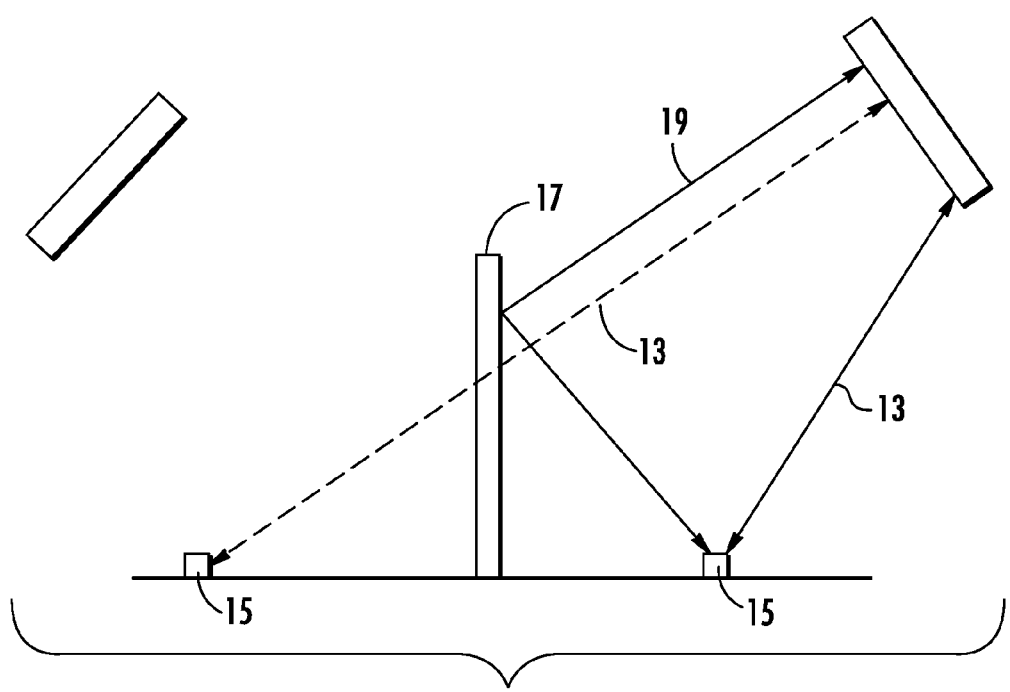
FIG. 5 is a schematic diagram according to FIG. 3, with all of the untagged objects removed.

The rules engine 3 operates upon two primary indications of an untagged object(s) 11 presence in the target area 9, demonstrated in FIGS. 3-5. First, in a line of sight parameter 13, the response signal from a reference RFID tag 15, will become measurably degraded and/or cut off entirely as untagged object(s) 11 and/or structures 17 occur in and/or are placed in the signal path between the reference RFID tag 15 and an antenna 7, for example covering and/or obscuring the signal path to a reference RFID tag 15, thereby identifying the presence of an untagged object 11 along a signal path between the reference RFID tag 15 and an antenna 7. The reference RFID tag(s) 15 may be passive RFID tags permanently attached around the target area 9, for example on the floors, shelving and/or ceiling of a storeroom, warehouse or other space to be monitored. Second, in a pseudo emitter parameter 19, untagged objects and/or structures 17 including RF reflective surfaces (metal and/or metal coated surfaces) occurring and/or placed proximate a reference RFID tag 15 signal path will generate pseudo emitter responses with respect to that RFID tag 15 that may be located in three dimensions within the target area 9 as if they were RFID tags, themselves. Further, where separate antenna(s) 7 are arrayed about the target area 9, the different lines of sight between each antenna 7, various reference RFID tag(s) 15 and an untagged object 11 may generate both line of sight signal parameter 13 and pseudo emitter parameter 19 responses with respect to the same untagged object(s) 11, greatly improving the rules engine accuracy (for diagram clarity, representative signal paths/parameters are diagrammed with respect to only one of the antenna 7).

In an exemplary embodiment of the invention, the signals received from the ITCS in real time and/or as accessed from the ITCS data matrix 5 include the following signal parameters applied as inputs to signal processor(s) 11 integrated with and/or coupled to the processor unit 1:

The phase $\phi$ of a received signal at an instant in time $t_i$;

the amplitude of the received signal at the same instant in time $t_i$;

a fast Fourier transform (FFT) of the received signal envelope at the same instant in time $t_i$; and a time reference.

The resolution and accuracy of the time reference is preferably very high, for example derived from an atomic clock, GPS signal or the like. The signal processor(s) 11 output a time coded signature (sig) which is a unique signal signature for time t, generated by the signals received by the ITCS from each of the antenna(s) 7 along a known antenna signal beam orientation, stored as a mathematical representation, for example resulting from FFT processing of frequency and pahse, as well as frequency and amplitude signal data. Where multiple antenna(s) 7 are applied, the target spatial coordinate where the antenna signal beams are directed to intersect may be applied to each signal record as a specific three-dimensional reference location of the signal signature obtained.

The signal signature feeds a function processor 23 which may be a separate component coupled with or an internal logical function of the processor unit 1. The function processor 23 derives and outputs a running average sub-signature f(sig), from a plurality of samples of the time coded instantaneous signature (sig) received by the function processor 23 over an observation period.

The observation period may be varied by the processing unit 1 to take account of changes in the environment or other user defined parameters. A plurality of sub signatures is further processed by the processing unit 1 to derive two further signatures, a primary signature and a reference signature for each spatial coordinate.

Figure 6:
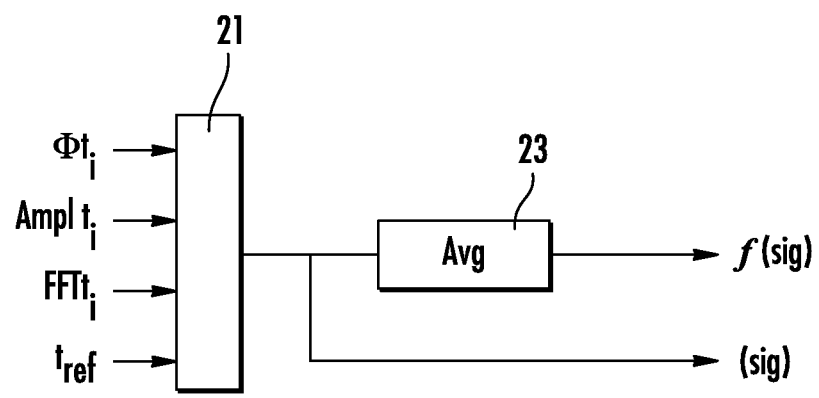
FIG. 6 is a schematic diagram of a signal processor and a function processor module.
Figure 7:
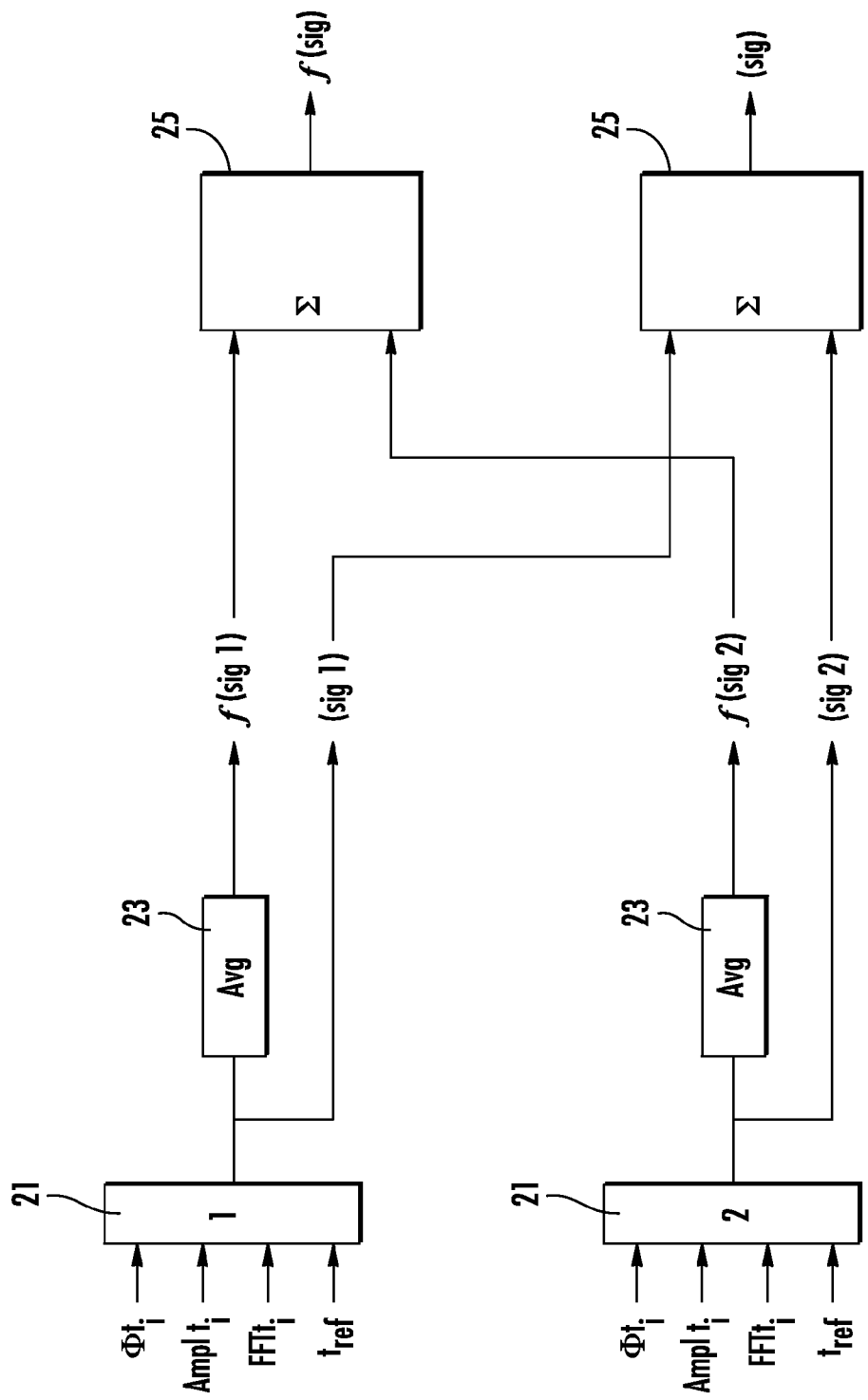
FIG. 7 is a schematic diagram of a dual antenna embodiment generating signal inputs for the processing unit.

FIG. 6, demonstrates signal/data flow through a basic signal processor 21 and function processor 23 module. As shown in FIG. 7, multiple signal processor(s) 21 and function processor(s) 23 modules may be applied, for example each fed by signals from a different antenna 7. Signals generated by signal processor(s) 21 and function processor(s) 23 are mathematically summed by respective summing processor(s) 25 to produce a composite running average sub-signature f(sig) and instantaneous signature (sig). These two signatures represent a unique instantaneous signature (sig) and a running average sub-signature f(sig) for a known location within the target area 9. Thus, the data matrix 5 may be loaded with a signal signature representing the signal response for each of a plurality of unique spatial positions within the target area 9 of the ITCS. The system is explained herein with reference to a two antenna system. One skilled in the art will appreciate that the system result will improve as additional antenna's and associated signal processor and function processor modules are added to the ITCS.

Figure 8:
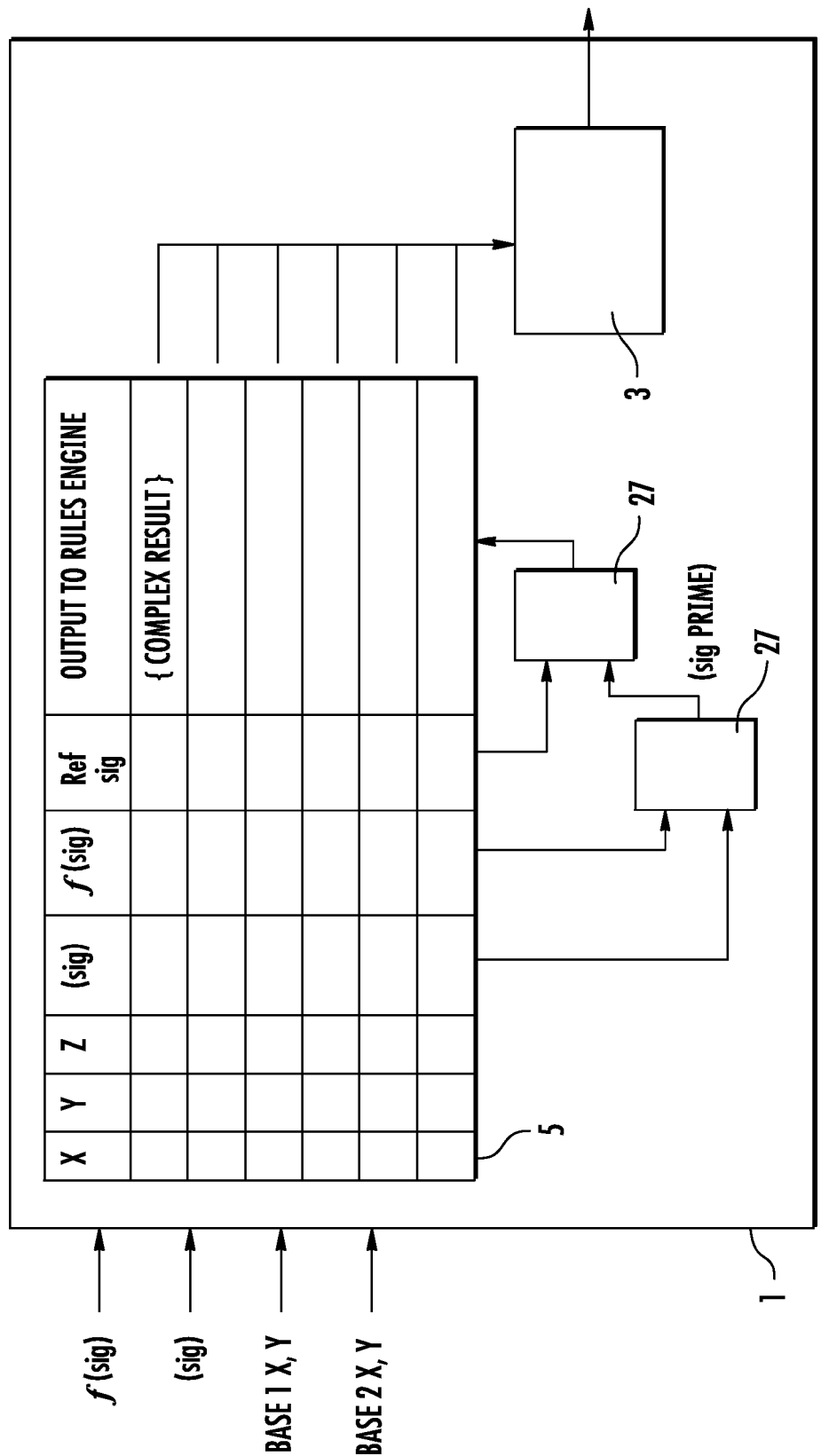
FIG. 8 is a schematic diagram of a processing unit including a rules engine.

As shown in FIG. 8, the processor unit 1 may be selected to have significant processing power for both mathematical and signal processing.

In its most simple form, the processor unit 1 receives two inputs from a single signature generator, average sub-signature f(sig) and (sig) for the X and Y (azimuth and elevation) coordinates of the point in space from which the signature was derived. This information is stored in the data matrix 5. The processor unit 1 causes the beam steered antenna(s) 7 to scan the environment in steps whose size depends on the beam illumination, preferably such that there is a slight overlap between steps. This can be best understood by picturing a flashlight being swept across a wall. The flashlight is moved a step at a time. At each step the light is momentarily switched on and a picture taken. The flashlight is moved and the light is again momentarily switched on such that the illuminated patch slightly overlaps the previous patch. This process is repeated in a raster scan until the entire wall has been examined. A series of measurements is made for each beam position and the average sub-signature f(sig) and (sig) for each spatial point is recorded in the data matrix 5 with the X,Y or where known, X,Y,Z position of the target point in space.

A recording cycle may be defined as one complete sweep of the target area 9. The processor unit 1 causes a plurality of recording cycles to be undertaken to build a running average for an average sub-signature f(sig) of each spatial location that may be further processed to derive an updated reference signature for each spatial location. The reference signature (Ref sig) is an average of many primary signatures and is used as a reference for determining whether change has occurred in the environment. Thus, the data matrix 5 may be updated with each sweep of the target area 9.

In addition, the reference signature (Ref sig) may also include a signature of the background Radio Frequency noise and or signals with the interrogator switched off, i.e. the background RF noise due to sources other than the primary emitter. This background signature is used by the processor to specifically exclude environmental changes due to Radio Frequency sources not generated by the system of this invention. These noise sources may include but are not exclusively due to transmissions or emitters such as TV or mobile radio base stations, Cellular base stations, low power and Part 15 devices operating in the same radio neighborhood, etc. as well as unintentional radiators such as computing and other non radio transmitting devices.

To improve signal quality, the background noise signature may be subtracted from any of the other signatures, such as the instantaneous signature, the average signature and the running reference signature, a procedure referred to as noise canceling.

For the purposes of further explanation reference will be made to a single spatial point. One skilled in the art will appreciate that similar processing may be applied to each spatial point and/or a series of partially overlapping points in the target area to derive a change analysis and thus inventory of the entire target area by extension of the single point processing disclosed hereafter.

The processor unit 1 uses three pieces of information to determine a change in the environment and measure the magnitude and nature of the change. The change analysis is then routed to a "rules" engine 3 which then takes action based on the nature of the change and pre-determined or preset user requirements.

The three pieces of information used are:
The instantaneous signature (sig) representing a single sample of a single point in the environment,
the average sub-signature f(sig) of the same point; and
the reference signature for the same point in space.

Figure 9:
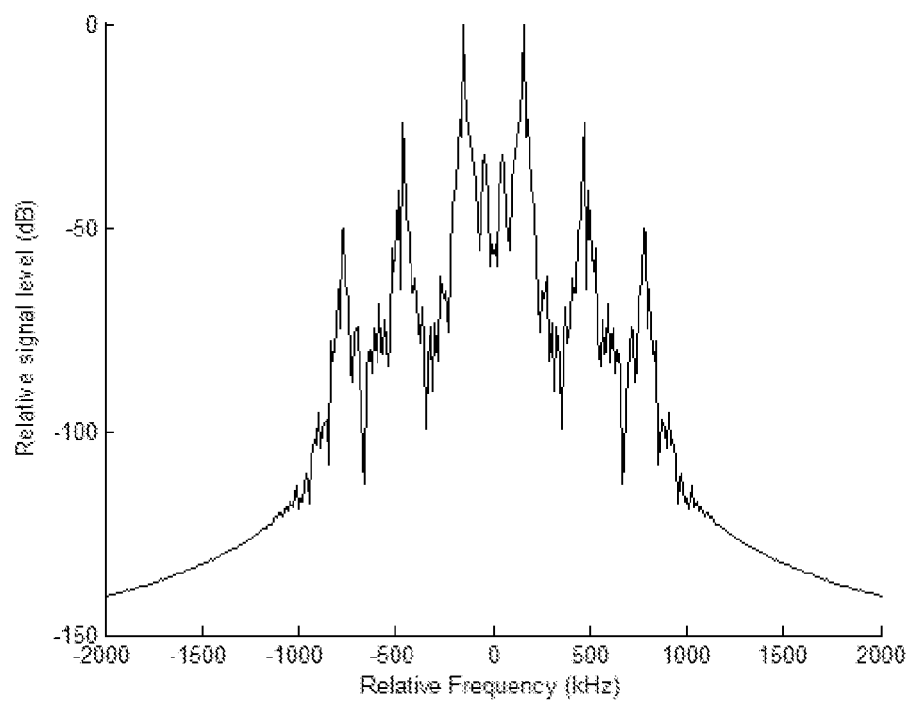
FIG. 9 is a schematic graphical representation of an instantaneous signature of a target area location with respect to signal level and frequency.
Figure 10:
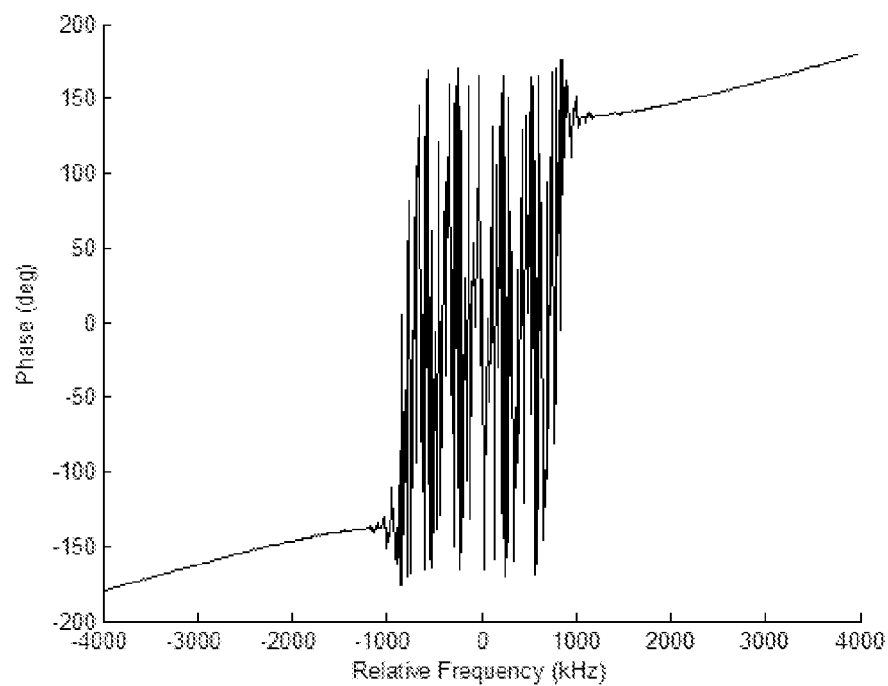
FIG. 10 is a schematic graphical representation of the instantaneous signature of FIG. 9, with respect to phase angle and frequency.
Figure 11:
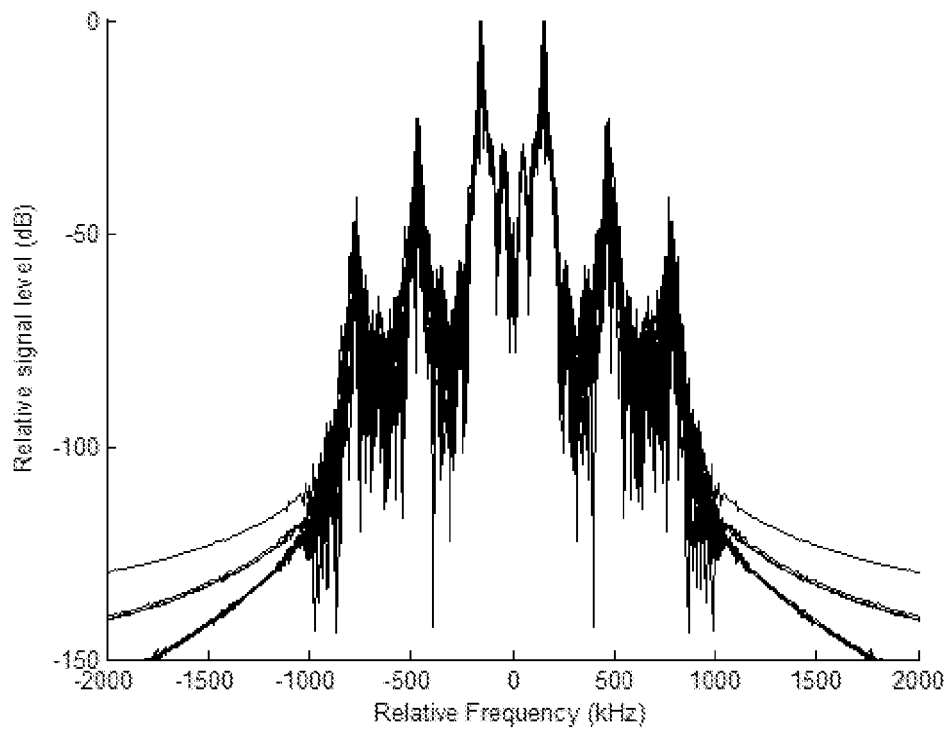
FIG. 11 is a schematic graphical representation of an average sub-signature derived from sampling the instantaneous signature of the target area location of FIG. 9 over an extended time period.
Figure 12:
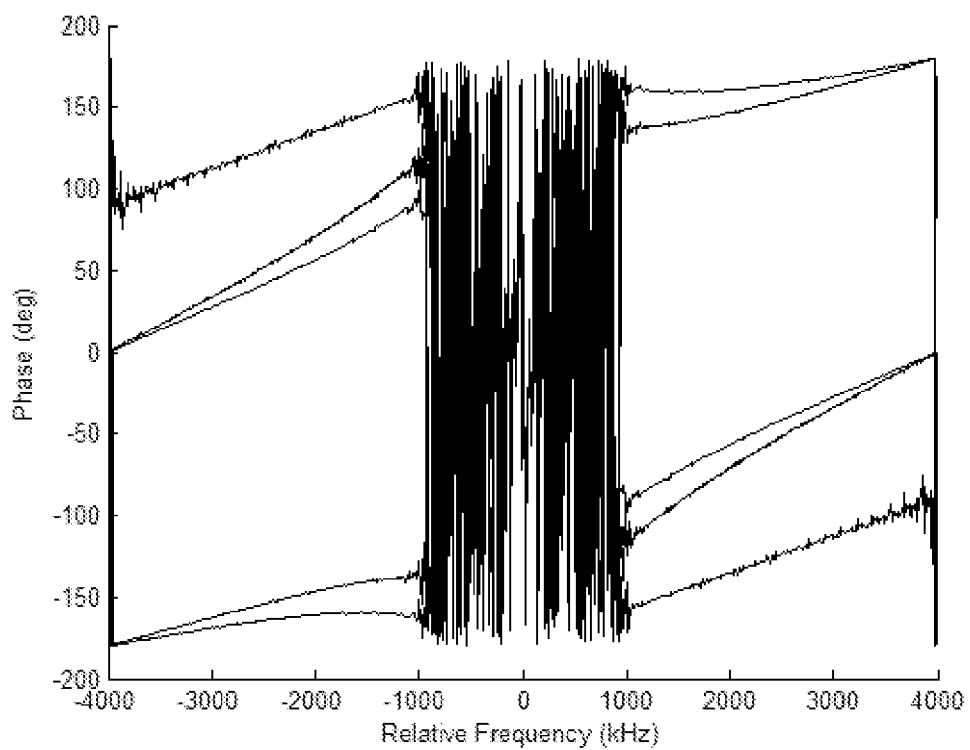
FIG. 12 is a schematic graphical representation of the average sub-signature of FIG. 11, with respect to phase angle and frequency.
Figure 13:
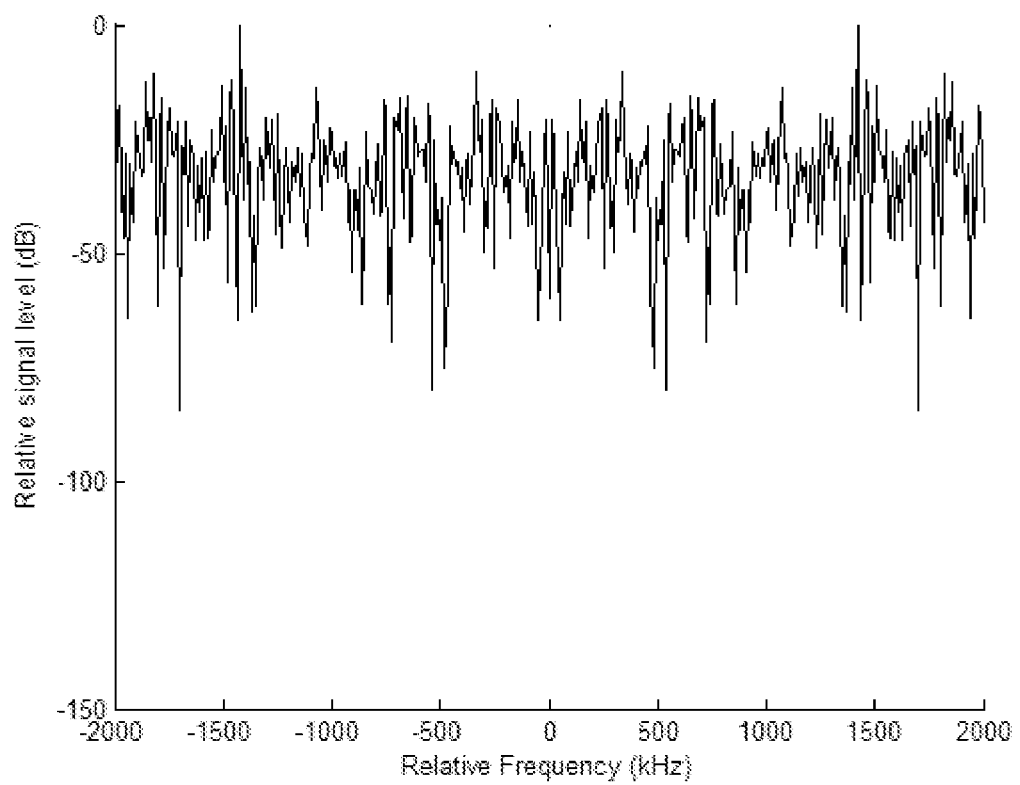
FIG. 13 is a schematic graphical representation of background environmental noise at a target area location with transceivers of the ITCS turned off.
Figure 14:
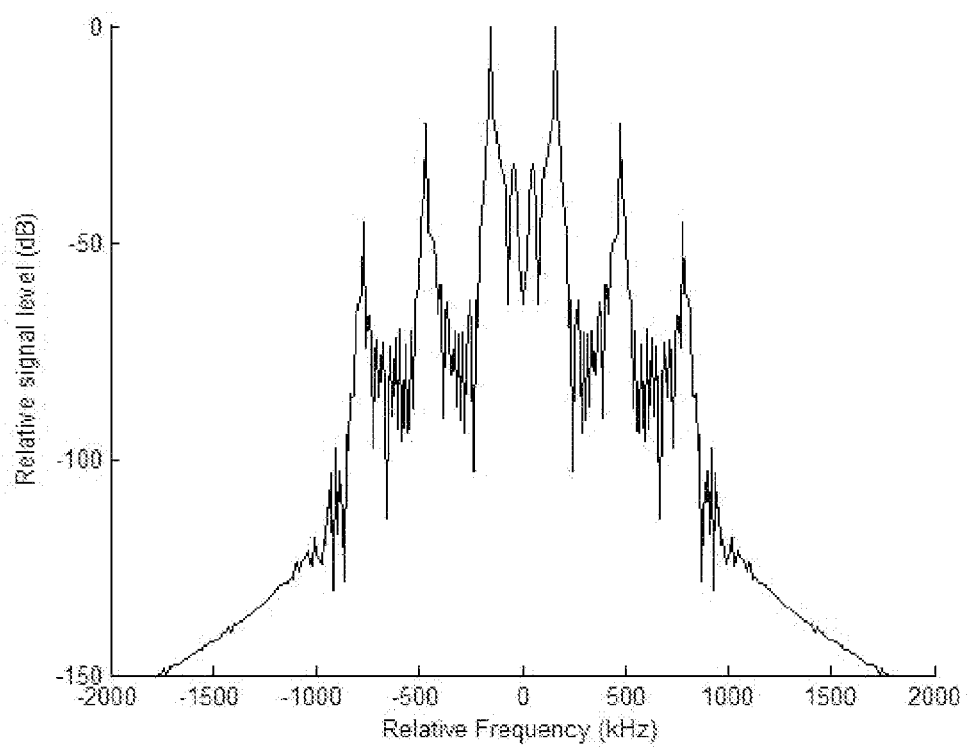
FIG. 14 is a schematic graphical representation of the RF environment fingerprint, with respect to signal level and frequency, obtained from a target area as it is successively scanned when initially empty of untagged objects.
Figure 15:
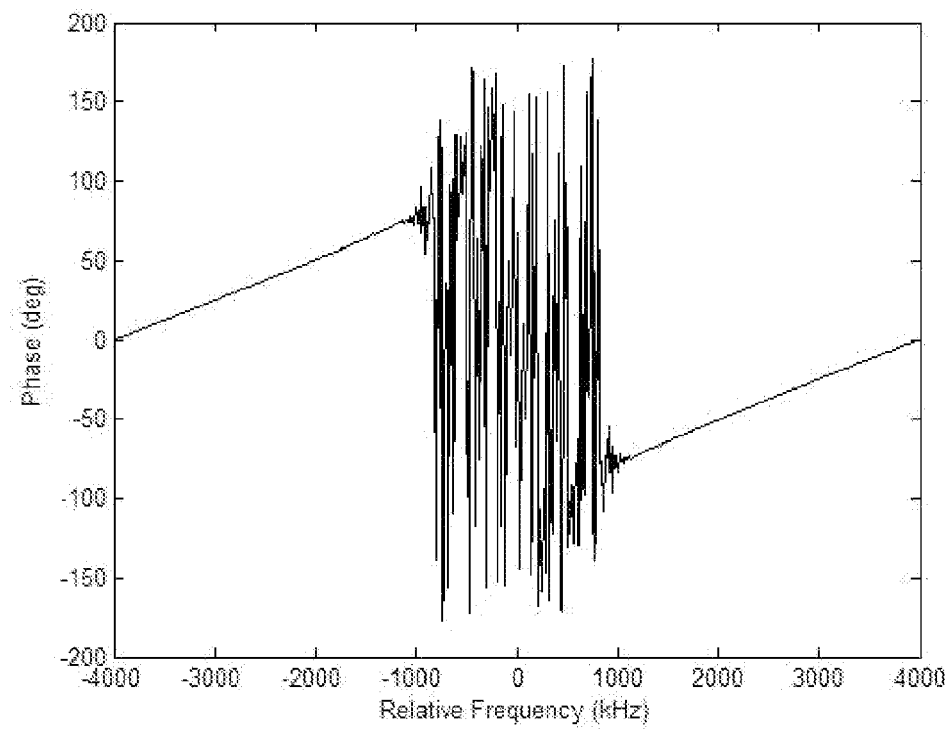
FIG. 15 is a schematic graphical representation of the RF environment fingerprint of FIG. 14, with respect to phase and frequency.
Figure 16:
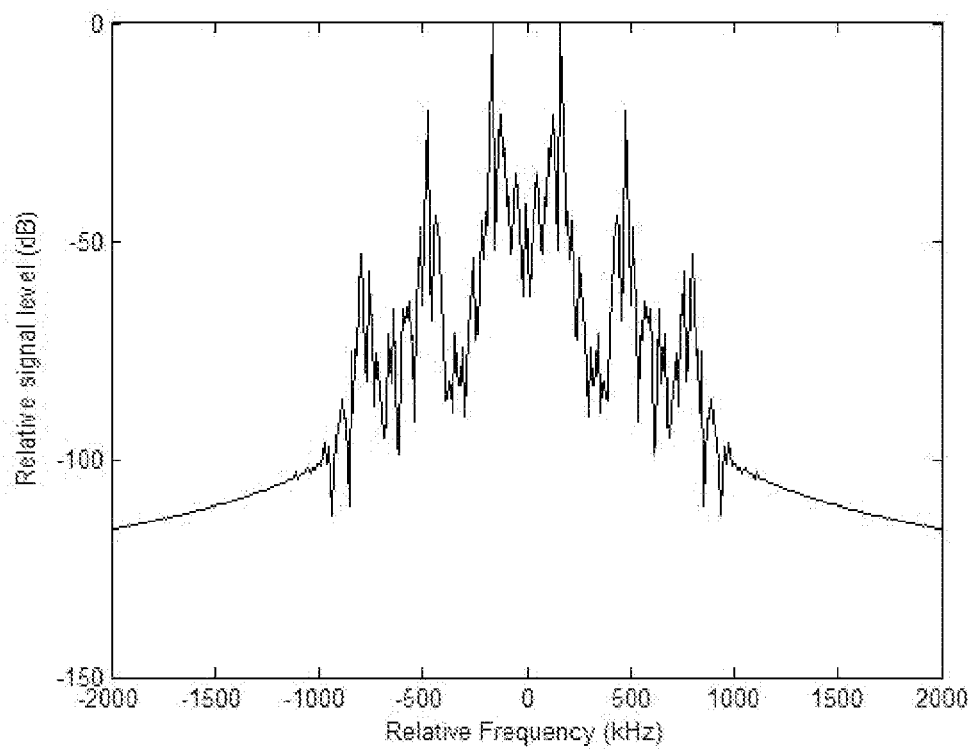
FIG. 16 is a schematic graphical representation of the RF environment fingerprint, with respect to signal level and frequency, obtained from the target area of FIG. 14, as it is successively scanned when one half filled with untagged objects.
Figure 17:
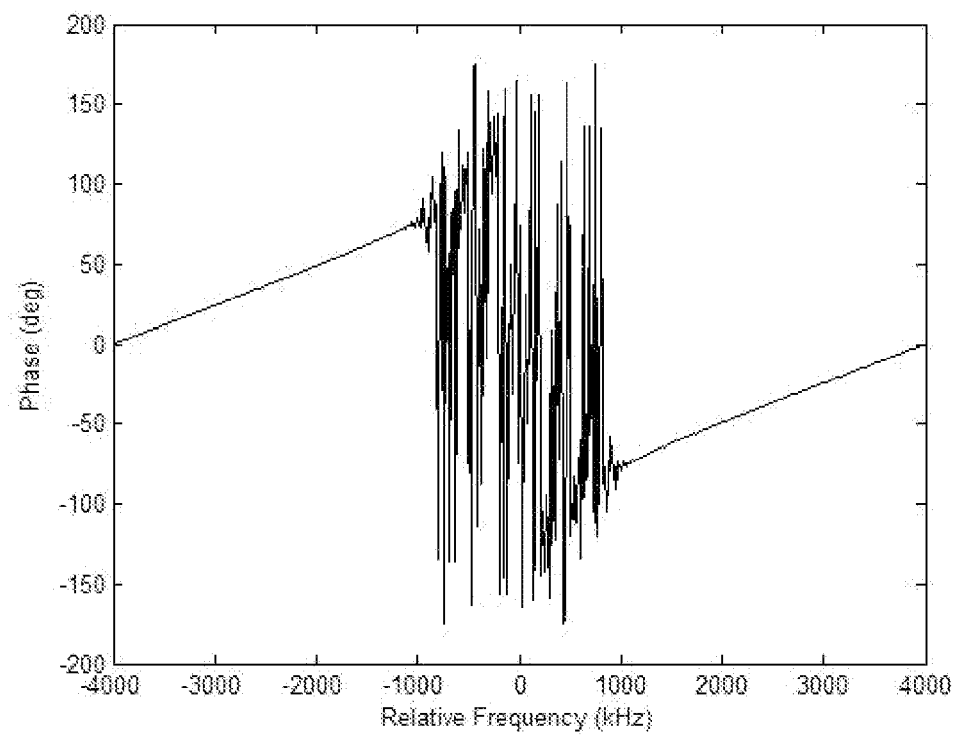
FIG. 17 is a schematic graphical representation of the RF environment fingerprint of FIG. 16, with respect to phase and frequency.

The processor unit 1, compares the instantaneous signature (sig), for example as represented graphically with respect to frequency and signal level in FIG. 9 and contemporaneously with respect to phase angle with respect to frequency in FIG. 10, with the values of the average sub-signature f(sig), for example as graphically shown in corresponding FIGS. 11 and 12, in a comparator processor 27 in order to determine whether the instantaneous signature (sig) is within preset limits. In other words the average sub-signature f(sig) is used to check the validity of the instantaneous signature (sig) to make sure that it was not a spurious read or a one-time aberration. As described herein above each of these signatures, also referred to as RF fingerprints, may also be processed to subtract the background environmental noise that may be present, for example as graphically represented by FIG. 13. The result of this check is a primary signature (sig prime) for that particular point in space.

The primary signature (sig prime) is then compared with the reference signature from the data matrix 5 in a further comparator processor 27. If there is a significant change, then the resulting nature of the change is routed to the rules engine 3, which triggers the appropriate action according to the established rules framework. If there is no significant change, then it is assumed that the environment has remained stable over the preceding period of time. The method using two antenna systems is the same. However because there are two steerable beam base stations, it is possible to more accurately determine a point in space using the azimuth and elevation positions from the two base stations to derive X, Y and Z positional information via triangulation. Further, dual (or more) signal beams intersecting at a desired location increase the interrogation signal intensity, for the desired point of interest, without radiating RF power beyond established limits, outside of the target area 9.

Figure 18:
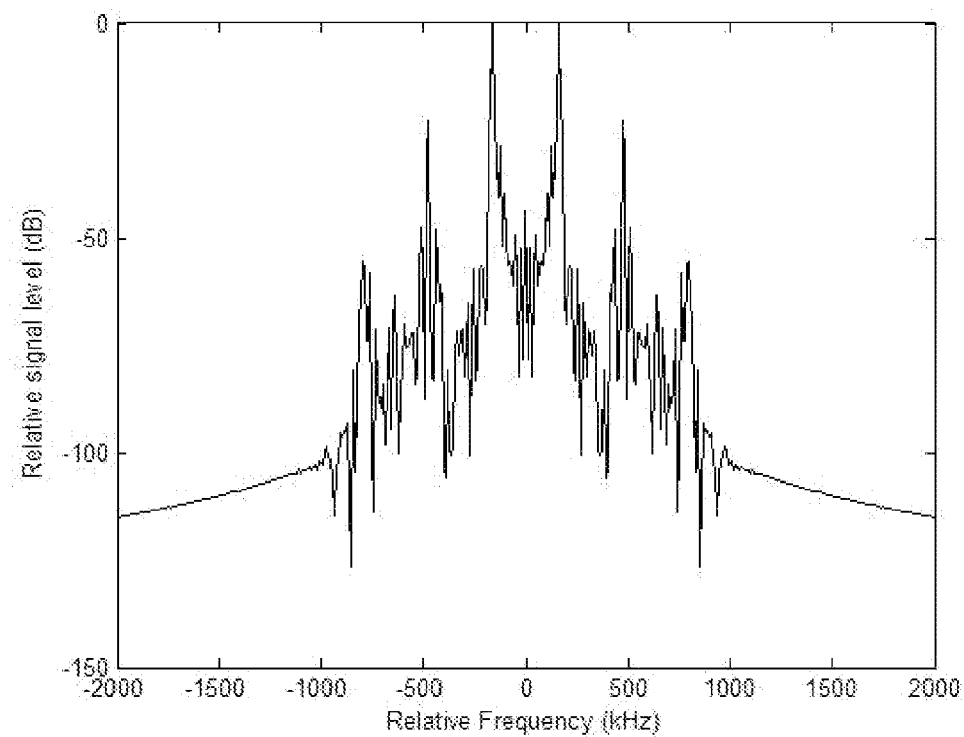
FIG. 18 is a schematic graphical representation of the RF environment fingerprint, with respect to signal level and frequency, obtained from the target area of FIG. 14, as it is successively scanned when one half filled with untagged objects.
Figure 19:
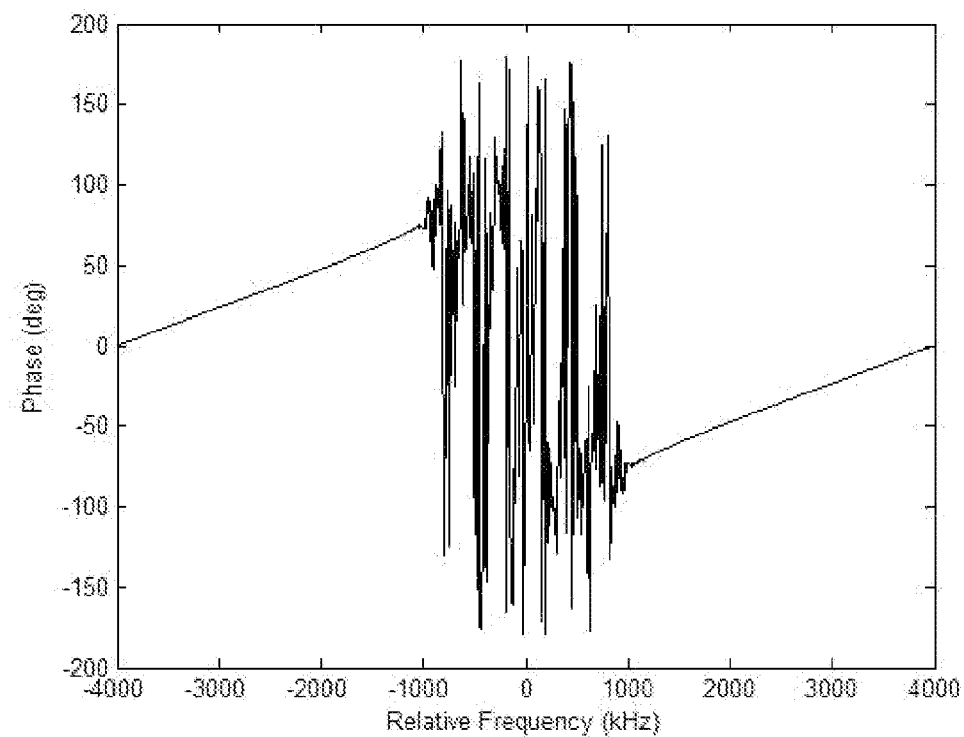
FIG. 19 is a schematic graphical representation of the RF environment fingerprint of FIG. 18, with respect to phase and frequency.

Baseline calibration RF environment fingerprint data is collected during system configuration to represent a range of possible target area 9 configurations, for example of the target area 9 entirely empty of untagged objects 11, and then in multiple instances as the target area 9 is successively filled with target objects. FIGS. 14-19 graphically demonstrate a simplified set of representative signals from which RF environment fingerprint obtained from the same target area 9 as it is successively scanned either during initial calibration sweeps and/or during area monitoring, for example when initially empty of untagged object(s) 11 (FIGS. 14, 15), half of the untagged object(s) 11 removed (FIGS. 16, 17) and finally fully filled with the untagged object(s) 11 (FIGS. 18, 19). In the entirely empty state, pseudo emitter signal parameters 19 related to structure(s) 17 of the target area 9, identified by their longer interrogation to backscatter response signal reception time delay (resulting from a longer signal path via, for example, reflective surfaces of supports and or shelves) may be mapped for later exclusion from rules engine pseudo emitter parameter 19 signal location/processing. Once an "empty" RF environment fingerprint of a target area 9 has been mapped, further changes to the RF environment fingerprint may be recorded, associated with known events, such as the appearance and location of dynamic pseudo emitter signal responses that appear/disappear during calibrated re-stocking and/or depletion of specific tagged and/or untagged object(s) 11 within the target area. Multiple RF environment fingerprint(s) obtained during each calibration step and also during ongoing real time monitoring may be averaged to improve accuracy and/or discard erroneous data points.

Dynamic pseudo emitter signals may be further identified with the assistance of signal specific scans of the target area 9. For example, while an interrogation signal is focused upon a particular location known to include a reference RFID tag 15 or other response signal source, the entire target area 9 may then be scanned to identify the locations of any associated pseudo emitter parameter 19 signals that may have appeared or disappeared since the last RF environment fingerprint was scanned.

In addition to purely radio frequency inputs from within the target area 9, the qualified appearance and/or disappearance of specific tag identifications within the monitored RF environment may be used to dynamically and automatically determine actions to be taken by the RF environment monitor, such as altering the coverage pattern to sweep particular areas in a predetermined manner.

For example, in one embodiment of the system, a known reference RFID tag 15 is attached to the lower edge of each of a plurality of dock roller-doors such that as the door is opened the reference RFID tag 15 rises from the floor to the top of the opening. The radio environment monitor observes and monitors the position of the door reference RFID tag 15 of each door as well as the location of individual tags on items or objects in the vicinity of each of the dock doors. The rules engine is configured to recognize these changes to the target area access and further apply an association between an individual dock door and the items that should be loaded through the dock door. If the dock door is opened when it should not be open or if the incorrect items are loaded through the dock door then an action may be triggered.

In an environment in which objects are stocked on shelves or movable promotional display modules, as might typically be the case in a grocery retail store for example, the baseline data set of the target area 9 RF fingerprint may include a scan of a target area 9 including a higher resolution focus on individual storage shelving on which a plurality of reference RFID tag(s) 15 are arrayed. The baseline data set identifies positions of each of the reference RFID tag(s) 15, as well as any static pseudo emitter parameter 19 signals generated by any RF reflective surfaces present in the target area when each of the shelves is empty of the untagged object(s) 11 to be monitored. As untagged object(s) 11 to be monitored are then successively added to the shelves, the signal response characteristics of each of the reference RFID tag(s) 15 attached to the shelves and/or wall(s) behind the shelves changes and/or new pseudo emitter parameter 19 signals are introduced into the RF environment fingerprint by RF reflective surfaces of the untagged object(s) 11. Also, the baseline data set may include changing response signal absorption characteristics, if any, which may occur as the untagged object(s) 11 to be monitored begin to cover and or obscure the reference RFID tag(s) 15 line of sight parameter 13 (the signal response with the shortest time delay between interrogation and backscatter signal response from an RFID tag, such as a reference RFID tag 15) and/or pseudo emitter parameter 19 signal paths with respect to one or more of the antenna(s) 7.

By monitoring changes in the RF environment fingerprint, event rules may be applied by the rules engine to generate user outputs and/or situation reports. For example, changes to stock presence and/or quantity in a specific bin may be estimated; the bin presence and/or object quantity therein may be tracked, for example generating reports of objects for which the inventory is running low. Thus inventory monitoring or the like may be performed via RFID, without requiring an individual tag on each object.

Large groups of tagged items may be similarly monitored by observing the number and location of signal responses received from a large concentration of RFID tagged objects, even if a significant number of the RFID tags are obscuring/covering one another and preventing them from being detected. Further any RFID tags affixed to objects within the target area 9, may be treated for purposes of the RF environment fingerprint as reference RFID tag(s) 15, with any associated signal degradation and or pseudo emitter data applied only as long as these RFID tags are monitored to be in the position associated with the particular RF environment fingerprint.

This baseline data set may be updated from time to time to compensate for changes in the environment. The system may be configured to automatically and dynamically update the baseline data set as small changes occur.

By monitoring the environment and comparing large changes to the reference RF environment fingerprint of the stored baseline data set, the system may compute that something in the target area 9 has changed and make a decision based on this change using the rules engine 3. Where multiple factors within the rules engine 3 indicate an objects presence, such as signal degradation and/or dynamic pseudo emitter parameter 19 signal detection from multiple paths, reference RFID tag(s) 15 and/or antenna(s) 7, an increased probability factor may be assigned to the resulting rules engine 3 conclusion. Rules engine 3 conclusions may then be assessed depending upon their assigned probability factor totals and only those meeting a threshold probability factor higher than a preset level output for pre-assigned action(s).

During the calibration procedure, specific shelf locations may be allocated to specific objects to enable monitoring and reporting upon the presence of multiple separate object classes, corresponding for example to different consumer products in a grocery store environment and or multi-item distribution warehouse.

If the system is further coupled to the electronic stock-keeping computer system, the change in the RF environment fingerprint may be associated with items removed from the shelves and the rules engine 3 may then, for example, trigger a purchase order to be raised.

One skilled in the art will appreciate an advantage of the invention is that objects may be tracked and located without a need to individually tag them. By tagging the environment, for example the shelves and or object bins instead of each individual object, and recording how the RF environment fingerprint, including pseudo emitter parameter 19 signals associated with desired objects, then changes as the target area 9 is filled and/or emptied of objects, for example by comparison with a baseline data set, it is then possible to monitor the movement or change of position of untagged objects in the target area 9 with significant precision.

| Table of Parts | |
|---|---|
| 1 | processor unit |
| 2 | transceiver |
| 3 | rules engine |
| 4 | operator interface |
| 5 | data matrix |
| 7 | antenna |
| 9 | target area |
| 11 | untagged object |
| 13 | line of sight parameter |
| 15 | reference RFID tag |
| 17 | structure |
| 19 | pseudo emitter parameter |
| 21 | signal processor |
| 23 | function processor |
| 25 | summing processor |
| 27 | comparator processor |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A radio frequency environment object monitoring system, comprising:
a three dimensional radio environment monitoring system, comprising
an RF transmitter-receiver coupled to an antenna, the antenna provided with an electronic steering circuit;
the antenna operative to launch a continuous wave signal, the continuous wave signal steerable by the electronic steering circuit;
a processor provided with a data matrix for storing a plurality of signal data records of a plurality of response signal(s) received by the RF transmitter-receiver; and
a position logic operative upon the data record(s) to derive a three dimensional signal origin location of the plurality of response signals within a target area;
a baseline data set of the response signals associated with known object locations within the target area, prior to entry into the target area of untagged objects;
the plurality of response signals including an RF environment fingerprint, the RF environment fingerprint including:
a fast Fourier transform (FFT) of a received signal envelope at an instant in time; and
a time reference;
and
a rules engine for comparing the signal data record(s) with the baseline data set to determine an object inventory.

2. The system of claim 1, wherein the three dimensional radio environment monitoring system is an intelligent tracking and control system.

3. The system of claim 1, wherein the three dimensional radio environment monitoring system includes at least two RF transmitter-receivers and antennas.

4. A method for monitoring untagged objects in a target area, comprising the steps of:
  calibrating a three dimensional radio environment monitoring system for a target area by recording a baseline data set of changes to an RF environment fingerprint of the target area received by the three dimensional radio environment monitoring system as the target area is filled with objects;
  the RF environment fingerprint including:
    a fast Fourier transform (FFT) of a received signal envelope at an instant in time; and
    a time reference;
  scanning the target area with the three dimensional radio environment monitoring system for a current RF environment fingerprint;
  comparing the current RF environment fingerprint with the baseline data set of changes to the RF environment fingerprint of the target area received by the three dimensional radio environment monitoring system as the target area was filled with objects by a rules engine; and
  reporting an output of the rules engine.

5. The method of claim 4, wherein the baseline data set includes changes to the RF environment fingerprint caused by filling the target area with multiple objects in multiple positions within the target area.

6. The method of claim 4, wherein the rules engine includes a line of sight parameter wherein a degradation of a signal response from a reference RFID in the target area indicates the presence of an object along a line of sight between the reference RFID and an antenna associated with the signal response.

7. The method of claim 4, wherein the rules engine includes a dynamic pseudo emitter parameter wherein a pseudo emitter that appears and or disappears correlates to an object being positioned at a known location according to the baseline data set.

8. The method of claim 4, wherein the rules engine includes a static pseudo emitter parameter wherein a signal degradation of a static pseudo emitter correlates to an object being positioned at a known location according to the baseline data set.

9. The method of claim 4, wherein the rules engine output is an inventory report indicating that an inventory of an object has fallen below a preset amount.

10. The method of claim 4, wherein the rules engine output is coupled to an electronic stock keeping system that issues a purchase order for an object that has fallen below a preset amount.

11. The method of claim 4, wherein the RF environment fingerprint is averaged from multiple scans of the target area.

12. The method of claim 4, wherein each of a plurality of records of the baseline data set is averaged from multiple scans of the target area during a static object condition.

13. The method of claim 4, wherein the appearance in the RF environment fingerprint of a registered reference RFID(s) indicates a change to the target area access.

14. The method of claim 13, wherein the change to the target area access is the opening of a door.

15. The method of claim 4, wherein the rules engine applies a probability factor to an object presence determination.

16. The method of claim 15, wherein the rules engine only outputs object presence determinations that have a probability factor above a preset level.

17. The method of claim 4, wherein objects with RFID tags are included as sources of reference RFID tags during RF environment fingerprint monitoring.

\* \* \* \* \*